Aug. 4, 1931. R. C. ANGELL Re. 18,142
MECHANISM AND PROCESS FOR FABRICATING FLEXIBLE SHAFTING
Original Filed Aug. 7, 1924 4 Sheets-Sheet 1
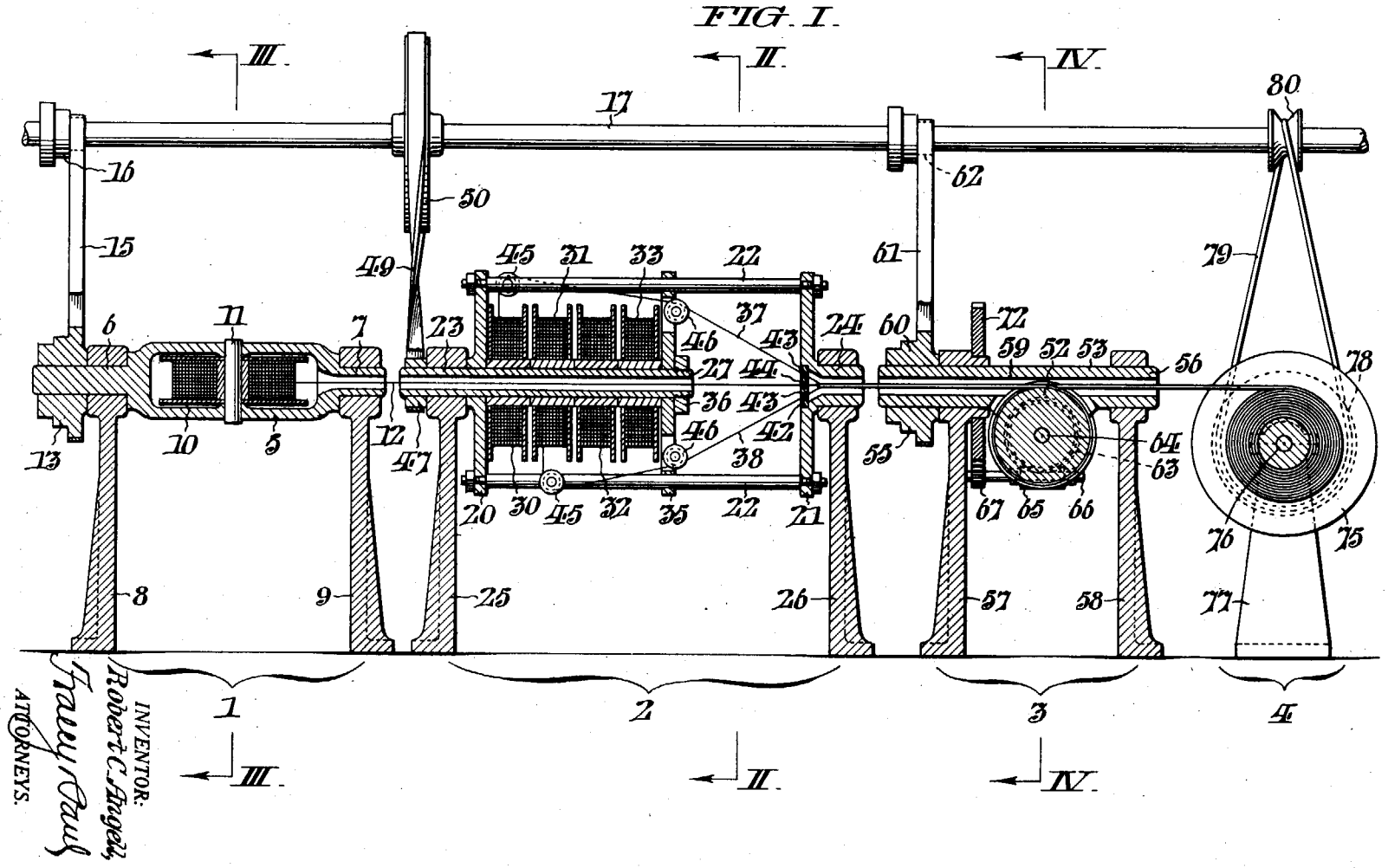

MECHANISM AND PROCESS FOR FABRICATING FLEXIBLE SHAFTING
Original Filed Aug. 7, 1924 4 Sheets-Sheet 2
FIG. II.
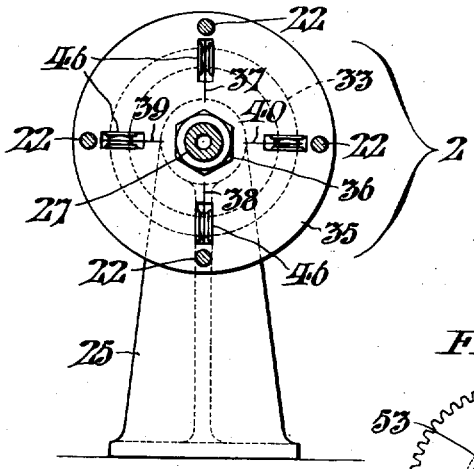
FIG. III.
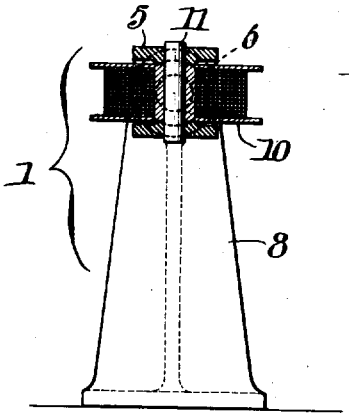
FIG. IV.
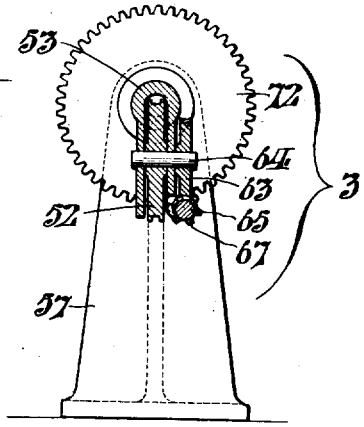
FIG. V.
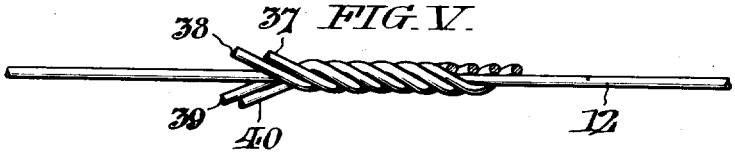
FIG. VI.
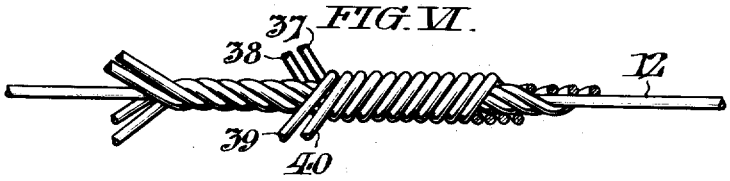
FIG. VII.
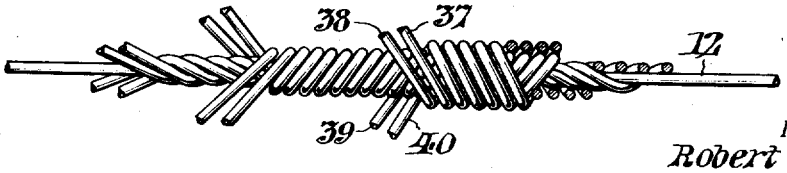
INVENTOR:
Robert C. Angell,
BY Fraley & Paul
ATTORNEYS.

MECHANISM AND PROCESS FOR FABRICATING FLEXIBLE SHAFTING
Original Filed Aug. 7, 1924 4 Sheets-Sheet 3
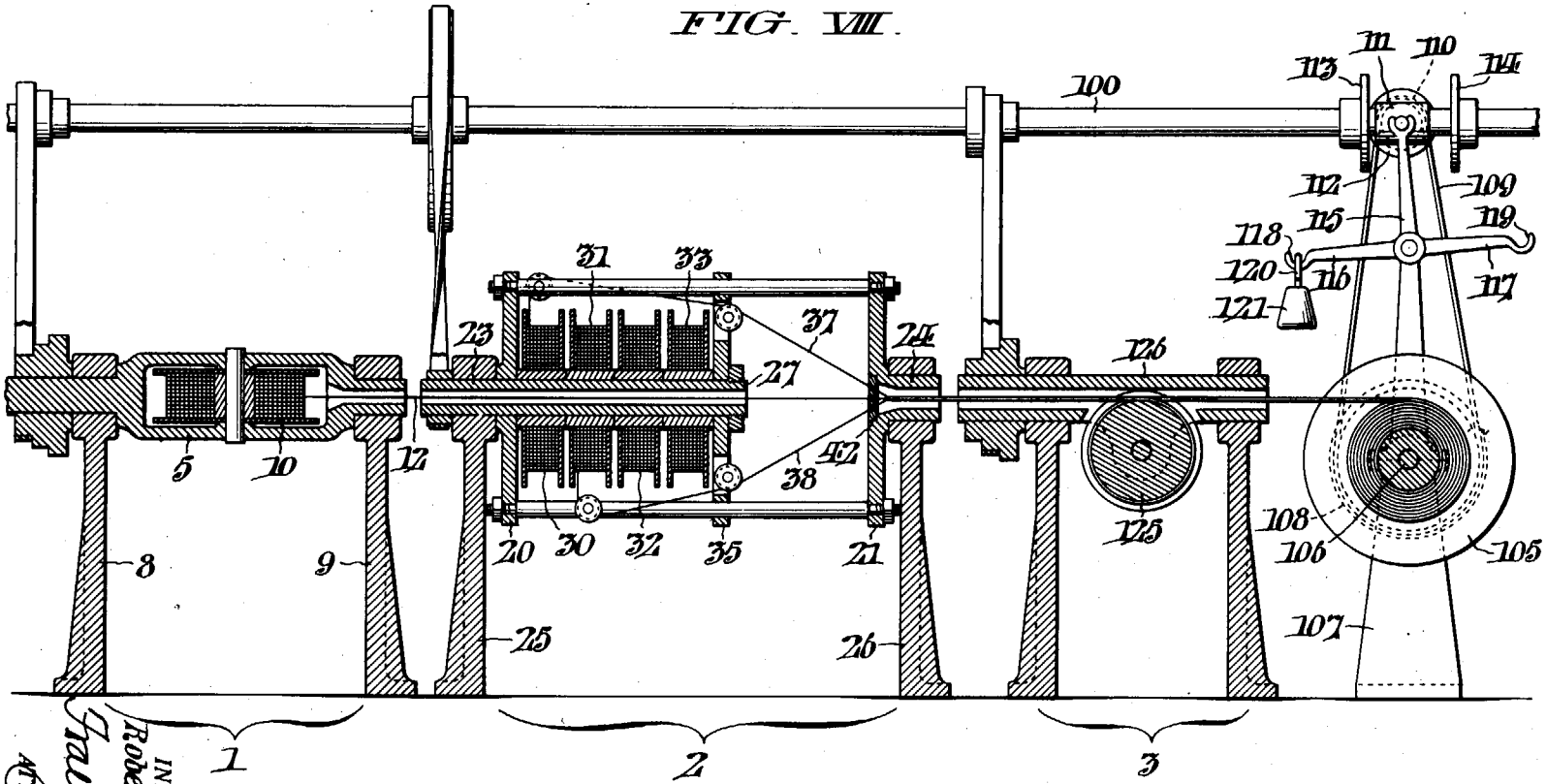

MECHANISM AND PROCESS FOR FABRICATING FLEXIBLE SHAFTING
Original Filed Aug. 7, 1924 4 Sheets-Sheet 4
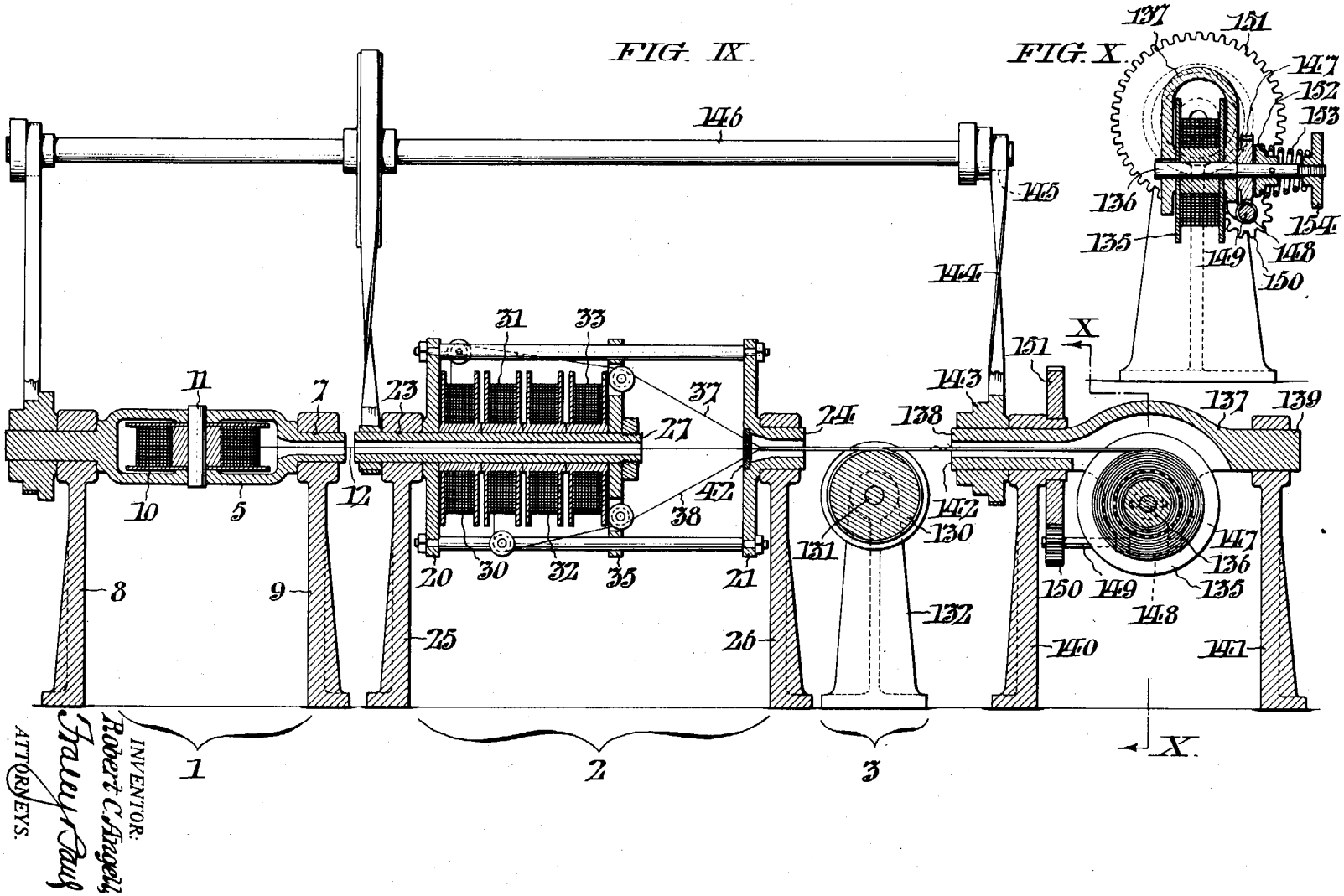

Reissued Aug. 4, 1931 Re. 18,142

UNITED STATES PATENT OFFICE

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA

MECHANISM AND PROCESS FOR FABRICATING FLEXIBLE SHAFTING

Original No. 1,671,951, dated May 29, 1928, Serial No. 730,740, filed August 7, 1924. Application for reissue filed February 5, 1930. Serial No. 426,171.

My invention relates particularly to that class of mechanism wherein a layer of wire is helically coiled around a core to form a flexible driving shaft for connecting movable elements for synchronous actuation.

In the production of flexible shafting formed of a plurality of layers of wire or strip material superposed in coiled relation one upon the other, there are considerable stresses and strains, due to the tension which must be exerted in the bending of the individual elements in coiling them about the core, which tends to produce torsional stress and an initial pressure contact between the helically wound elements and the core and which effects undue internal friction when such shaft is rotated about its axis in flexed or curved condition, and furthermore, there is a tendency of this product when released to twist upon itself into a tangled mass. Owing to the inherent stresses and strains produced by the tension of the individual elements of such shaft it has heretofore been impractical to produce shafting which is sufficiently free from internal friction to be successfully employed as a driving shaft, except in limited lengths.

The principal object of my invention is to provide in flexible shaft producing mechanism, means tending to so untwist or recoil the shafting as to relieve the initial stresses incident to the tension exerted in the laying on of the elements of the superposed windings, whereby an inert flexible shaft, and one substantially free from internal friction and embodying the desired flexibility, may be produced in what may be termed continuous length, or shaft that may be taken up by spooling mechanism as fabricated. Any length of shafting may be considered continuous when it of such length that the "end effects", as they are termed, may be ignored, i.e. is so long that the effect of any stresses and strains at the free ends of this length do not alter or modify the characteristics of my continuous fabrication procedure or of the product resulting from this procedure.

When I speak of "recoiling" the shafting I refer to a partial untwisting or uncoiling of the outer, or last applied, helical layer during the fabrication of the shafting. This partial untwisting or uncoiling of the said layer will also simultaneously slightly twist the core or underlying body upon which this layer has been laid to form a composite shaft; and my invention contemplates and takes account of this simultaneous twisting of the outer layer and the underbody. But the important object of this twisting operation is to effect the slight recoil or turning back of the last helically wound coil whereby the over-tight winding of that coil is relieved, with a corresponding relief of the internal stresses and strains occasioned by the too great pressure contact, which the fabrication of the shafting has occasioned, between the helical layer and the underlying body. In this way the fabricated shaft is not only rendered inert, but is also substantially free from internal friction when employed as a turning or connecting shaft and is rotated or otherwise actuated in a flexed or curved condition.

Specifically stated one form of my invention, as hereinafter described, comprises a core spool carrier or payout mechanism, a wire bobbin carrier or winding mechanism, and recoil or untwisting mechanism, and a take-up reel or spooling mechanism, upon which the fabricated shafting is wound, and means whereby the rotation of the independent units about the axis of the shaft may be relatively varied.

My invention also includes all the various novel features of construction and arrangement as hereinafter more definitely specified.

In the accompanying drawings, Fig. I is a vertical longitudinal sectional view of a machine constructed in accordance with my invention.

Fig. II is a transverse vertical sectional view of the machine shown in Fig. I taken on the line II—II in said figure.

Fig. III is a transverse vertical sectional view of said machine taken on the line III—III in Fig. I.

Fig. IV is a transverse vertical sectional view of said machine taken on the line IV—IV in Fig. I.

Fig. V is a side elevational view of a short length of the fabricated structure forming the shaft and showing the first layer of strands coiled upon the core.

Fig. VI is a side elevational view of a section of said shaft showing the second layer of strands coiled thereon.

Fig. VII is a side elevational view of a section of said shaft showing the third layer of strands coiled thereon.

Fig. VIII is a vertical longitudinal sectional view of a machine embodying a slight modification of construction.

Fig. IX is a vertical longitudinal sectional view of a machine embodying another modification of construction; and Fig. X is a transverse vertical sectional view taken through the take-up reel on the line X—X in Fig. IX.

The machine shown in Figs. I to IV inclusive may preferably be composed of separate units cooperatively connected and comprising a core payout carrier 1, the wire dispensing and winding or laying-on mechanism 2, the recoil or untwisting mechanism 3, arranged to rotate the shaft about its longitudinal axis, and the take-up or spooling mechanism 4.

The core-dispensing carrier has the flier-frame 5 provided with trunnions 6 and 7 rotatably mounted in the standards 8 and 9 and having the core-carrying spool 10, which is mounted to rotate in said flier-frame 5 on the shaft 11 whose axis extends transverse to the axis of rotation of said flier-frame 5, and which is arranged to pay out the core 12 guided through the hollow trunnion 7.

Rotation of the flier-frame 5 upon the axis of the core may be effected in any convenient manner, but I have chosen to illustrate a simple method which comprises the pulley 13 secured on the trunnion 6, and having varying diameters arranged to be connected by the belt 15 with a similar stepped pulley 16 on the countershaft 17.

The wire-feeding and winding mechanism comprises the bobbin frame having its end walls comprising the disks 20 and 21 connected by the spacing bars 22, and respectively having hollow trunnions 23 and 24 mounted for rotation in the standards 25 and 26, the trunnion 23 being extended inwardly to form the hollow stud 27 upon which the bobbins 30, 31, 32 and 33 may be rotatably mounted and removably held in position thereon by the disk 35, which is retained on the stud 27 by the retaining nut 36.

Said bobbins 30, 31, 32 and 33 are respectively arranged to deliver wires 37, 38, 39 and 40 to the die 42, suitably mounted in the disk 21 and having therein suitable apertures 43 through which said wires are arranged to pass, and the aperture 44 for the core 12, which is directed through the hollow trunnion 23, hollow stud 27 and hollow trunnion 24, and about which said wires 37, 38, 39, and 40 are coiled by the rotation of the wire bobbin frame and its die 42. The wires 37, 38, 39 and 40 are respectively directed to the die 42 by passing over suitable guide rollers or pulleys 45, preferably carried by the spacing bars 22, and over the guide rollers or pulleys 46, which may be conveniently carried by the disk 35.

The rotation of the bobbin frame may be conveniently effected by the pulley 47 which is mounted on the trunnion 23 and connected by the driving-belt 49 with the pulley 50 on the countershaft 17, the pulley 50 being of much greater diameter than the pulley 47, so as to rotate the bobbin frame at a comparatively high rate of speed.

As shown in Fig. I, the assembled structure thus formed may be progressed longitudinally, at a predetermined rate of speed, by the recoil mechanism comprising the drum 52, around which said structure may be wrapped for one or more turns, and which is mounted for rotation in the frame 53 on an axis transverse to the direction of lineal movement of the shafting and having its peripheral surface in tangential relation with respect to the lineal axis of said shafting; thereby producing both an axial draft and a transverse or radial pressure on the external coils of the axially moving shaft which will control its movement: i. e., will hold it against slipping or rotative movement on, or relative to, the drum surface. Mechanism which accomplishes this latter function may be termed controlling or holding mechanism.

Said frame 53 is itself mounted for independent rotation about the axis of the shafting, having trunnions 55 and 56 mounted for rotation in the standards 57 and 58, and being provided with an aperture 59 forming a guide through said trunnions 55 and 56 for the passage of the shafting, which as already stated, is arranged to be wrapped one or more turns around the surface of said drum, from which it passes to the take-up mechanism, to be hereinafter described.

The trunnion 55 of the recoil mechanism is provided with the stepped pulley 60, which is connected by the driving belt 61 with the stepped pulley 62 on the counter-shaft 17, and may be rotated with the core pay-out mechanism at different speeds in the same or opposite direction as may be determined by the desired direction of rotation of the winding mechanism in the application of the successive helically coiled layers of wire; it being obvious that this direction of rotation of the said winding mechanism must be reversed in the steps of first applying a right hand helical winding such as is shown in Fig. V and then a left hand helical winding such as is shown in Fig. VI. But it will also be obvious, from the disclosure of the drawings and of the preceding portion of this specification that the direction of rotation of the recoil mechanism must in this case be opposite to that of the winding mechanism. I provide for different relative speeds of rotative movement of these two mechanisms for the purpose of obtaining various predetermined amounts of recoil per unit of length of the fabricated product. The steps of the pulley 62 enable me to employ a different amount of recoil in each successively applied layer of the helically disposed windings.

Positive rotation of the drum 52 on its axis may be effected through the worm gear 63 on the shaft 64 of said drum, by cooperation with the worm 65 whose shaft 66 carries the gear 67 in mesh with the gear 72 which is secured in stationary relation upon the standard 57. This positive rotation of the drum 52 on the shaft 64 results in a fixed and constant axial movement of the shaft, which results, in turn, in a fixed and predetermined pitch of the successive coils of the helically wound layer of wires as they are applied to the core by the action of the winding mechanism.

The take-up mechanism comprises the take-up reel 75 having its shaft 76 mounted for rotation in the standards 77, and provided with the pulley 78 connected by the belt 79 with the pulley 80 on the countershaft 17. The pulley 80 drives the take-up reel at a rate sufficient to advance the shaft at a constant speed of delivery as it passes from the drum 52 to the take-up reel;—any difference of rotative speed required for the take-up reel being provided for by slippage of the cord 79 on the pulley 80. It is obvious that the maintenance of this tension in the product as it is wound on the take-up reel 75 will prevent the product so wound from any rotative movement thereafter about its own axis. It follows that the extent of the rotation of the recoil head or mechanism on the trunnions 55, 56 determines the extent to which the shaft is recoiled during its passage from said recoil mechanism to the winding drum. I have used the term recoil to denominate the twisting of the shaft during fabrication in a direction opposite to that in which the last helical layer has been wound about the core, accompanied by a relieving of that internal pressure which was effected by the unavoidably too tight winding of the helical coils on the core by the action of the winding mechanism.

The various stages of construction of the fabricated shafting are depicted by enlarged illustrations in Figs. V, VI and VII; the first layer of wires 37, 38, 39 and 40, being laid side by side in coiled relation about the core 12, as shown in Fig. V; the second layer of wires being laid upon the first layer in oppositely directed coiled relation, as shown in Fig. VI; and the third layer of wires being coiled in crossed relation to the second layer, as shown in Fig. VII, whereby the composite shaft is formed by successive layers of four wires each disposed side by side, it being understood however, that the machine may be adapted to form the shaft by fabricating the layers of one or more wires, and said shaft may be formed of as many layers as may be deemed practical.

In the form of my invention shown in Fig. VIII, the longitudinal progression of the shaft may be effected solely by the take-up mechanism, which may be so driven as to produce a predetermined constant axial movement of said shaft. Said take-up mechanism comprises the take-up reel 105, having its shaft 106 mounted for rotation in the standards 107, and provided with the pulley 108 connected by the belt 109 with the pulley 110 which is carried by a suitable slide frame 111 mounted for longitudinal movement on the countershaft 100, and having a friction wheel 112 arranged to engage either of the opposed surfaces of the friction disks 113 and 114.

The friction wheel 112 is arranged to be held in engagement with the friction disks 113 and 114 by the double bell-crank-lever 115, which has one arm engaged with the slide-frame 111 which has its laterally extended arms 116 and 117 provided with suitable hooks 118 and 119 arranged to receive the loop or ring 120 of the weight 121. As will be obvious, said weight may be engaged with either of said hooks 118 or 119, depending upon which of the friction disks 113 and 114 the friction wheel 112 is to be engaged, and upon the direction in which the countershaft 100 may be rotated.

In this form of my invention shown in Fig. VIII, the recoil drum 125, which is mounted for rotation in the frame 126 is rotated on its own axis by the take-up mechanism pulling on the fabricated shaft, which is wrapped around said drum 125, as shown, and requires no gearing such as shown in Fig. I. The recoil drum frame 126 is rotated as a whole about the axis of the product being formed by a stepped pulley drive such as has been previously described and, in Fig. VIII, I have chosen to show the core dispensing bobbin and the recoil frame so connected with the driving shaft as to rotate at relatively different speeds.

In the form of my invention shown in Figs. IX and X, the holding drum 130 is mounted for rotation about the axis of its shaft 131 which is carried by bearings in the standard 132, said rotation being effected by the axial movement of the product, which is wrapped one or more times around said drum and drawn forward by the take-up reel 135.

In this form of my invention, the take-up reel 135 not only rotates on its own axis to longitudinally progress the flexible shaft, but it is also arranged to rotate bodily around the longitudinal axis of said shaft, the said reel 135 being supported in the frame 137, which has the trunnions 138 and 139 mounted to rotate in the standards 140 and 141, these trunnions being provided with the bore 142 through which the shaft passes to said reel 135. The rotation of said frame 137 may be effected by the stepped pulley 143 which is connected by the belt 144 with the stepped pulley 145 on the countershaft 146. In this form of my invention, as in the two previously described forms, I employ the stepped pulleys 143 and 145 for the purpose of obtaining various predetermined amounts of recoil per foot of length of the last applied layer; and thus I may progressively vary the amounts of the said recoil in the successively applied helically disposed windings.

The shaft 136 of the take-up reel 135, is arranged to be rotated by a train of gearing comprising the worm gear 147, worm 148, on the worm shaft 149 having the pinion 150 in toothed engagement with the gear 151, which is secured on the standard 140, so, as will be obvious, when the frame 137 is rotated about the longitudinal axis of the shafting, the take-up reel 135 will be caused to rotate on the axis of its shaft 136.

It will also be obvious that the take-up reel 135 and the worm gear 147 may both be secured to the shaft 136 so as to rotate the reel at a predetermined speed and consequently draw out the fabricated shaft at a like speed, but if the roll is to be used to spool or wind up a number of superimposed layers of fabricated product, said worm gear 147 is loosely mounted to rotate on the shaft 136 and is frictionally connected with the take-up reel 135 by any desired form of tension mechanism, such, for typical illustration, as shown in Fig. X, wherein the friction disk 152 is forced into engagement with the worm gear 147 by the spring 153 and the tension varied by the adjusting nut 154, whereby any desired pull may be exerted to draw out said fabricated shaft.

Although, in this form of my invention, the holding drum 130 does not rotate bodily about the longitudinal axis of the fabricated shaft, as in the other forms of my invention, it will be obvious, that said drum cooperates with the take-up mechanism whose take-up reel 135 is arranged to rotate bodily about the longitudinal axis of the shaft being fabricated, to effect the same recoil or untwisting of the last wound helical layer of said shaft, as is accomplished by the equivalent rotation of the drum frames 53 and 126 of the previously described embodiments of my invention.

It is to be understood that the means herein shown and described for actuating the associated parts of my improved apparatus is typical and simply for illustrative purposes, as it is obvious that the parts may be readily connected for cooperation by other means, such, for instance, by suitably correlated gearing.

Furthermore, it is to be understood that the core body herein referred to may consist of a single wire or may be composed of a plurality of wires laid parallel, or coiled about each other in any form desired, as for example as shown in Figs. V and VI.

My invention is advantageous in that the composite product thus formed may be so rotated upon its longitudinal axis as to relieve the initial torsional stress imposed on the shaft elements during fabrication, so that when spooled upon the take-up reel the fabricated shaft will be substantially free from a tendency to twist upon itself and tangle, and when employed as flexible driving shaft it will be substantially free from internal friction when rotated in flexed or curved condition. It is obvious that these results will be accomplished by the partial uncoiling or recoiling of each helically wound layer of wires after they are laid on the core body; because when the parts are properly adjusted and operated, as before described, at uniform predetermined speeds, the pitch of each helical winding, and the length of the wire therein, remains constant for each unit length of the product as it is progressed through and drawn from the winding mechanism; and when this product is afterwards rotated on its longitudinal axis, as described, this action necessarily alters this pitch by reducing the number of helical coils per unit of length of the fabricated shaft; and this, in turn, permanently enlarges the inner diameter of the helical winding without substantially altering its axial length with respect to its core, thereby relieving the initial pressure stress or contact engagement between them and the underlying body on which they were wound.

When the underlying body consists of a core and one or more overlying helical layers, —as shown for example in Fig. V or VI— then the effect of twisting the fabricated shaft in the manner described is not only to increase the inner diameter of the last applied helical layer but also to decrease the outer diameter of the core body, and thus relieve the pressure contact therebetween by the relative change in the diameters of these two parts. In the twisting of the underlying layer—which tends to decrease its external diameter—the underlying layer or layers are returned to a certain degree to the condition in which they were before they were individually subjected to previous recoil actions; but, they are not completely returned to such condition because, I ordinarily give to the last applied layer a lesser recoil effect than has been given to any of the previously wound layers.

In all cases each of the recoil operations, or the aggregate of all of the recoil operations—if the shaft comprises more than one helical layer—results in a permanent increase in the diameter of each of the said layers relative to the diameter of the underlying body and this produces a fabricated product having the desired freedom from internal friction when used as a torque-transmitting element; and this structural characteristic is one which is present in the fabricated product independently of any effect which may result from subsequent torsional stress incident to the subsequent use of the shafting.

I do not desire to limit my invention to the precise details of construction and arrangement as herein set forth, as it is obvious that various modifications may be made therein without departing from the essential features of my invention as defined in the appended claims.

Having thus described my invention, I claim:

1. In a machine for the fabrication of flexible shafting in continuous lengths the combination of mechanism arranged to feed a core, mechanism for applying thereto a helically wound layer of wire, holding mechanism which engages the surface of the said helical layer and prevents its rotation with respect thereto without interfering with its progression therethrough, a take-up mechanism, and mechanism which effects rotation of one of the last two mentioned elements around the axis of the shafting at any predetermined speed and thereby produces a controllable untwisting of the said helical layer and a concurrent permanent twisting of the said core to relieve the initial pressure engagement therebetween.

2. In a machine for the production of flexible shafting in continuous lengths, the combination of mechanism for applying a helically wound layer of wire to a moving core, mechanism for spooling said shafting, and mechanism interposed between said winding mechanism and said spooling mechanism and co-operating therewith to effect a predetermined rotation of the said helical layer in a direction opposite to that in which it is wound and maintain it in this recoiled position throughout the spooling operation, to thereby obtain a permanent relief of the initial pressure engagement between the said layer and the said core.

3. In a machine for the production of continuous lengths of flexible shafting the combination of mechanism for progressing a core, a winding head for superimposing a helical layer upon said core, and mechanism for producing a permanent decrease in the pitch angle and a permanent increase in the mean diameter of the helically wound layer; the said mechanism comprising two elements with which the shafting is successively engaged, and by which its movement is controlled together with means for varying the relative angular position of these two elements with respect to each other about the axis of the shafting as the latter is progressed.

4. A machine for the production of continuous lengths of flexible shafting which comprises a winding head rotatable about the axis of the shafting, a pay-off reel for delivering a core to the winding head, a pull-out mechanism for progressing the core and the helical layer wound upon it at a predetermined rate of speed and which controls the position of the shafting at its points of engagement, a take-up reel operable independently of the pull-out mechanism, and means for rotating said pull-out mechanism around the axis of the shafting without like rotation of the take-up reel whereby said shafting is recoiled between the point where it leaves the pull-out mechanism and the point where it is engaged by the take-up mechanism, the internal diameter of said helical layer being thereby enlarged and its pressure contact with the underlying core relieved.

5. A machine for the production of continuous lengths of flexible shafting which comprises a winding head rotatable about the axis of the shafting, a pay-off reel for delivering a core to the winding head, a holding mechanism for progressing the core and the helical layer wound upon it at a predetermined rate of speed and for preventing the axial rotation of the shafting at its point of engagement therewith, a take-up reel operable independently of the holding mechanism, and means for rotating said take-up reel around the axis of the shafting without like rotation of the holding mechanism whereby said shafting is recoiled between the point where it leaves the holding mechanism and the point where it is engaged by the take-up reel, the inner diameter of said helical layer being thereby enlarged and its pressure contact with the underlying core relieved.

6. A machine for the production of continuous lengths of flexible shafting which comprises a winding head rotatable about the axis of the shafting, a pay-off reel for delivering a core to the winding head, a recoil drum, a take-up mechanism for drawing the shafting from the recoil drum at a predetermined rate of speed, and means for rotating the recoil drum around the axis of the shafting without like rotation of the take-up mechanism whereby said shafting is recoiled between the point where it leaves the drum and the point where it is engaged by the pull-out mechanism, the inner diameter of the helical layer being thereby enlarged and its pressure contact with the underlying core relieved.

7. In a machine for the manufacture of flexible shafting which comprises a core and a helical layer of wire wound thereon, the combination of a rotatable winding head, a take-up reel, and means engaging with the surface of the said helical layer between the winding head and the take-up reel, to prevent axial rotation of the said layer at the said point of engagement, and means for rotating the take-up reel at a variable predetermined speed in the same direction as that in which the winding head revolves, and thereby effecting a controllable recoil of the shaft between the said holding means and the said take-up reel.

8. A machine for continuously fabricating flexible shafts having a core and a superimposed helical layer which includes a core dispensing mechanism, winding mechanism, and take-up mechanism, the said core dispensing mechanism and winding mechanism being each mounted for rotation at independently adjustable speeds upon the axis of the fabricated product.

9. A machine for continuously fabricating flexible shafts having a core and a superimposed helical layer which includes a core dispensing mechanism, winding mechanism, and take-up mechanism, the dispensing mechanism and winding mechanism being each mounted for independent rotation upon the axis of the product, and a rotatable drum positioned between the winding mechanism and the take-up mechanism and adapted to exert both an axial draft and transverse pressure on the helical layers of the shaft whereby the coils are held against relative movement on the said drum.

10. A machine of the class described, comprising a plurality of cooperative units including means arranged to pay out a core wire, means arranged to wind wires about said core wire, and means arranged to progress the fabricated product longitudinally, all being mounted for relative rotation about the axis of said core wire, and cooperative to wind said wires together and to so recoil the fabricated product as to relieve the inherent tension.

11. A machine of the class described, comprising a plurality of cooperative units including means arranged to pay out a core wire, means arranged to wind wires about said core wire, and means arranged to progress the fabricated product longitudinally, all being mounted for relative rotation about the axis of said core wire, and cooperative to wind said wires together and to so recoil the fabricated product as to relieve the inherent tension, and means arranged to take up the fabricated product thus recoiled.

12. A machine of the class described, comprising a plurality of cooperative rotary units including core-dispensing mechanism, and wire winding mechanism, cooperative to form a fabricated shaft, take-up mechanism, and means disposed between the winding mechanism and take-up mechanism arranged to rotate the fabricated shaft upon its axis of longitudinal movement at a speed differing from the speed of rotation of said core dispensing mechanism.

13. In a machine of the class described, the combination with means arranged to dispense a core, of means arranged to form helical convolutions about said core, means for progressing the product longitudinally and contemporaneously rotating said product about the axis of its core, and a take-up for the product thus formed, cooperative with said progressing means, to untwist said fabricated product.

14. Mechanism arranged to wind together a plurality of wires into a fabricated flexible shaft, and comprising wire-winding means, take-up means rotatable about the longitudinal axis of said shaft, and means arranged to prevent the rotation of said shaft between said take-up means and said winding means, and thereby cooperate with said take-up means to effect recoil or untwisting of said shaft.

15. Mechanism arranged to wind together a plurality of wires into a fabricated flexible shaft, and comprising wire-winding means, take-up means rotatable about the longitudinal axis of said shaft, and comprising a take-up reel, and a recoil or untwisting drum having a fixed axis of rotation, around which the said fabricated shaft passes to prevent the axial rotation of said shaft between said take-up means and said winding means, and thereby cooperating with said take-up means to effect recoiling or untwisting of said shaft to relieve inherent stresses.

16. An improvement in the art of continuously fabricating flexible shafting which consists in first winding a helical coil of wire in close contact engagement with a core, and then permanently enlarging the inner diameter of the said coil without substantially altering its axial length with respect to the said core, to thereby relieve the pressure contact between the said parts of the fabricated shaft before it is subjected to the torsional strains incident to use.

17. An improvement in the art of fabricating flexible shafting in continuous lengths which comprises the winding of a plurality of superimposed closely coiled helices of wire on a central core, and enlarging the inner diameter of each helix before the succeeding one is wound, to thereby relieve the pressure engagement between each of the said helices and the underlying body.

18. An improvement in the art of fabricating flexible shafting in continuous lengths which comprises the winding of a plurality of closely coiled superimposed helices of wire on a substantially straight central core, and the twisting of each helix, after it has been wound and before the next helix is applied, in the direction opposite to that in which it was wound to thereby recoil and enlarge the inner diameter of said helix and relieve its pressure contact upon the underlying body 19. An improvement in the art of fabricating flexible shafting in continuous lengths, which consists in successively winding upon a core but in opposite directions helically coiled layers of wires each in close contact engagement with an underlying layer, and then permanently relieving the initial close engagement of the said core and the said layers by an untwisting operation which simultaneously alters the diameter of both the overlying and underlying coils as a part of the fabrication process and before the shafting is subjected to the torsional strains incident to use.

20. An improvement in the art of fabricating flexible shafting in continuous lengths which consists in first winding a helical coil of wire in close contact engagement with a core body and subsequently decreasing the number of turns in the helical coil without altering the length of shaft and spooling the product as thus fabricated.

21. An improvement in the art of fabricating flexible shafting in continuous lengths which comprises the formation of a composite core whose outer surface consists of helically disposed coils of metal, winding thereon another helical layer of wire in a direction opposed to the surface coils of the core and thereafter rotating the shafting thus formed in the direction opposed to that in which the outermost helical layer was wound, to thereby concurrently and permanently increase the inner diameter of the outermost helix and decrease the outer diameter of the immediately underlying helix, prior to the subjection of the shafting to the torsional strains incident to use.

In testimony whereof I have hereunto signed my name at Philadelphia, Pennsylvania, this 20th day of January, 1930.

ROBERT C. ANGELL.